United States Patent [19]

Lankton et al.

[11] Patent Number: 5,064,450
[45] Date of Patent: Nov. 12, 1991

[54] GAS ABSORBER METHOD AND APPARATUS

[75] Inventors: Steven P. Lankton, Wheeling; Robert B. James, Jr., Northbrook, both of Ill.

[73] Assignee: UOP, Des Plaines, Ill.

[21] Appl. No.: 636,784

[22] Filed: Jan. 2, 1991

[51] Int. Cl.$^5$ .............................................. B01D 47/00
[52] U.S. Cl. .......................................... 55/70; 55/71; 55/73; 55/90; 55/233; 261/97
[58] Field of Search ................. 55/70, 71, 73, 90, 233, 55/220; 261/94–98

[56] References Cited

U.S. PATENT DOCUMENTS

| 441,106 | 11/1890 | Monsanto | 55/248 |
| 2,715,521 | 8/1955 | Tatibana et al. | 55/220 |

Primary Examiner—Bernard Nozick
Attorney, Agent, or Firm—Thomas K. McBride; John G. Tolomei; John G. Cutts, Jr.

[57] ABSTRACT

A gas absorber for removing at least one gaseous component from a flowing gas stream by contacting the gas stream with a lean liquid stream to absorb at least a portion of the gaseous component to produce a rich liquid stream comprising the gaseous component and a flowing gas stream having a reduced concentration of the gaseous component which absorber comprises: (a) a double wall forming an annulus having a means for restricting fluid flow into the bottom of the gas absorber from the bottom of the annulus and a means for passing fluid out of an upper section of the annulus into the gas absorber; (b) an inlet for the lean liquid stream having a locus in the upper end of the gas absorber; (c) an inlet for the flowing gas stream; (d) an outlet for the rich liquid stream having a locus in the lower end of the gas absorber; (e) an outlet for the flowing gas stream having a reduced concentration of the gaseous component; and (f) at least one inlet communicating with the lower end of the annulus which inlet is used to introduce a lean liquid stream at least a portion of which flows upwardly through the annulus and overflows from the top of the annulus and thereby protecting at least a portion of the outer wall from contact with the flowing gas stream.

11 Claims, 1 Drawing Sheet

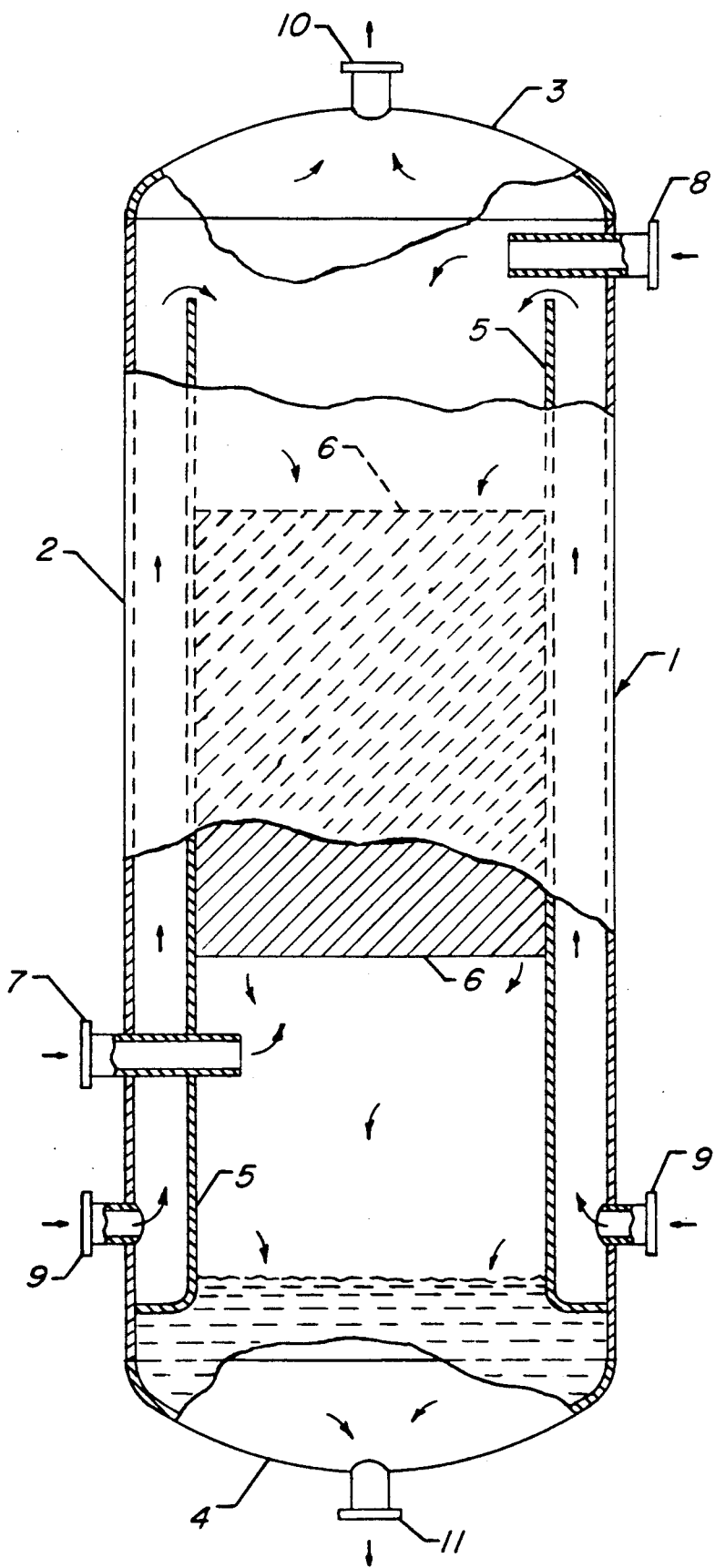

GAS ABSORBER METHOD AND APPARATUS

BACKGROUND OF THE INVENTION

The field of art to which this invention pertains is the absorption of one or more gas species from a flowing gas stream. In particular, the present invention pertains to the separation of gas species which are particularly aggressive towards conventional materials of construction which are used to build absorbers. More specifically, the invention relates to a gas absorber for removing at least one gaseous component from a flowing gas stream by contacting the gas stream with a lean liquid stream to absorb at least a portion of the gaseous component to produce a rich liquid stream comprising the gaseous component and a flowing gas stream having a reduced concentration of the gaseous component.

INFORMATION DISCLOSURE

The prior art proliferates in a wide spectrum of apparatus and processes for removal of certain species from a flowing gas stream. The applicants are not aware of any known prior art which either teaches or suggests the present invention. Because of the composition of the gas streams introduced into an absorber, corrosion and other undesirable effects have been observed in absorbers since the beginning of such operations. Those skilled in the art have attempted to avoid these problems by the appropriate selection of vessel metallurgy and operating conditions. However, the artisan occasionally sees situations where the enviroment in an absorber is so aggressive that even the use of expensive and exotic metals for constructing the absorber have limitations. In particular, when very high concentrations of hydrochloric acid are generated from the absorption of hydrogen chloride from a flowing gas stream in an aqueous solution, an extraordinary situation confronts the artisan who must design a system to safely and economically accomplish the desired result. In a severe environment such as, for example, one containing water, hydrogen chloride and hydrogen, zirconium is recommended as the material of construction for the absorber. However, even zirconium is not absolutely impervious to attack by concentrated hydrochloric acid. The most severe corrosion is expected to be observed when the concentration of hydrogen chloride in the aqueous solution is greater than about 30 weight percent.

The present invention provides a novel apparatus for the absorption of at least one gaseous component from a flowing gas stream while minimizing or eliminating undesirable corrosion of the absorber apparatus.

BRIEF SUMMARY OF THE INVENTION

The invention provides a novel apparatus which maintains a low concentration of acid or corrosive solution in contact with the vessel wall while allowing a higher acid concentration of the aqueous solution to be produced from the absorber. We have unexpectedly discovered that this may be accomplished by the use of a double-walled absorber. The system operating pressure is still contained by the outer wall which is constructed of a highly corrosion-resistant metal such as zirconium, for example. In the event that the concentration of acid or corrosive in the solution is low and the expected corrosion is estimated to be very low, other materials of construction for the outer wall may be deemed suitable. The inner wall, in accordance with the present invention, is not required to hold any of the system pressure and can thus be made of a highly corrosion-resistant material such as plastic, for example. The annulus between the walls is purged with a slow flow of aqueous solution having a low acid or corrosive strength or what may be characterized as a lean solution which may be readily tolerated by the material used in the outer wall. In the case when concentrated hydrogen chloride is produced at a concentration of about 30 weight percent, a suitable lean solution to be used to purge the annulus has a concentration of about 25 weight percent hydrogen chloride. The higher strength solution or acid which is generated in the absorber is primarily contained by the plastic liner or wall. Absorber internals in the annulus would necessarily be designed to allow the continuous purge of lower-strength acid or solution upward through the annulus. Another advantage of the present invention is that more of the outer wall is contacted with an aqueous solution which permits electrochemical corrosion protection. Electrochemical protection involves placing an electrode in the liquid phase and then maintaining an electrical potential between the liquid and the outer metal wall. However, this electrochemical protection technique is only effective in a liquid electrolyte, since the medium must conduct a small current flow in order to afford corrosion protection. Electrochemical protection cannot be enjoyed in the vapor-phase or two-phase regions because of the lack of a continuous conducting liquid electrolyte. In accordance with a preferred embodiment of the present invention, the lean liquid streams are aqueous.

In accordance with the present invention, the inner liner or wall extends through the two-phase and vapor sections, thus offering improved protection in these areas of the absorber. In addition, since the annulus is liquid-full with an electrolyte solution, electrochemical protection can be used, if desired, thereby affording an additional level of corrosion resistance. This electrochemical protection can also be used in the liquid phase in the bottom head of the absorber vessel, where the inner wall or lining may not be used in order to simplify the construction of the absorber vessel.

One embodiment of the invention may be characterized as a gas absorber for removing at least one gaseous component from a flowing gas stream by contacting the gas stream with a lean liquid stream to absorb at least a portion of the gaseous component to produce a rich liquid stream comprising the gaseous component and a flowing gas stream having a reduced concentration of the gaseous component which absorber comprises: (a) a double wall forming an annulus having a means for restricting fluid flow into the bottom of the gas absorber from the bottom of the annulus and a means for passing fluid out of an upper section of the annulus into the gas absorber; (b) an inlet for the lean liquid stream having a locus in the upper end of the gas absorber; (c) an inlet for the flowing gas stream; (d) an outlet for the rich liquid stream having a locus in the lower end of the gas absorber; (e) an outlet for the flowing gas stream having a reduced concentration of the gaseous component; and (f) at least one inlet communicating with the lower end of the annulus which inlet is used to introduce a lean liquid stream at least a portion of which flows upwardly through the annulus and overflows from the top of the annulus and thereby protecting at least a portion of the outer wall from contact with the flowing gas stream.

Another embodiment of the invention may be characterized as a process for removing at least one gaseous component from a flowing gas stream by contacting the gas stream with a lean liquid stream in a gas absorber to absorb at least a portion of the gaseous component to produce a rich liquid stream comprising the gaseous component and a flowing gas stream having a reduced concentration of the gaseous component wherein the process comprises: (a) passing a first lean liquid stream through at least one inlet communicating with the lower end of a double wall forming an annulus having a means for restricting fluid flow into the bottom of the gas absorber from the bottom of the annulus and a means for fluid flow out of the top of the annulus into the gas absorber wherein at least a portion of the first lean liquid stream flows upwardly through the annulus and overflows from the top of the annulus thereby protecting at least a portion of the outer wall of the gas absorber from contact with the flowing gas stream; (b) passing a second lean liquid stream through an inlet having a locus in the upper end of the gas absorber; (c) passing the flowing gas stream through an inlet into the gas absorber; (d) contacting the second lean liquid stream with the flowing gas stream to produce the rich liquid stream comprising at least a portion of the gaseous component and the flowing gas stream having a reduced concentration of the gaseous component; (e) recovering the rich liquid stream comprising at least a portion of the gaseous component from an outlet having a locus in the lower end of the gas absorber; and (f) recovering the flowing gas stream having a reduced concentration of the gaseous component from an outlet having a locus in the upper end of the gas absorber.

Other embodiments of the present invention encompass further details such as preferred mechanical components and design details, all of which are hereinafter disclosed in the following discussion of each of these facets of the invention.

BRIEF DESCRIPTION OF THE DRAWING

The drawing is presented in illustration of one preferred embodiment of the invention and is not intended as an undue limitation on the generally broad scope of the invention as set out in the appended claims. The drawing represents a side view of the apparatus in accordance with the present invention which is partially broken away and sectioned.

DETAILED DESCRIPTION OF THE INVENTION

When the chronological history of the art of gas scrubbing is traced, it becomes apparent that those having the requisite expertise recognize the benefits of scrubbing or removing a gas component from a flowing gas stream and recovering the gas component.

The present invention provides an improved process for the separation of gas species from a flowing gas stream which species are particularly aggressive towards conventional materials of construction which are used to build absorbers.

In accordance with the present invention, suitable flowing gas streams may contain acid gases such as, for example, hydrogen chloride and hydrogen fluoride, hydrogen, water vapor, sulfur compounds such as sulfur dioxide and hydrogen sulfide, for example, and ammonia.

The flowing gas stream which is introduced into the scrubber is contacted with a liquid phase in any convenient manner. A preferred method of contacting is achieved via a countercurrent contacting of a downwardly flowing lean liquid phase and an upwardly flowing gas stream in a contacting zone containing packing or other contacting media. Suitable packing may be metal mesh, finely divided carbon particles, Raschig rings, Lessing rings, Berl saddles and grid packing. The metal mesh packing is preferably made from highly corrosion resistant metal. The other potential packing materials are preferably made from plastic, for example, which is easily formed, highly corrosion resistant and lightweight.

In accordance with the present invention, preferred absorber operating conditions include a temperature from about 50° F. (10° C.) to about 250° F. (121° C.), a pressure from about atmospheric to about 1000 psig (6985 kPa gauge), a gas hourly space velocity of from about 800 $hr^{-1}$ to about 1800 $hr^{-1}$, and a gas/liquid mass ratio from about 0.01 to about 4.

DESCRIPTION OF THE DRAWING

As illustrated in the drawing, the apparatus of the present invention comprises absorber vessel 1 having absorber vessel wall 2, absorber vessel top end 3, absorber vessel bottom end 4, a flowing gas inlet 7 and flowing gas outlet 10. Absorber vessel 1 has an inner wall 5 which forms in cooperation with absorber vessel wall 2 an annulus having a closed bottom end and an open top end. The annulus between absorber vessel wall 2 and inner wall 5 is flushed by a lean liquid purge which is introduced by at least one lean liquid flush inlet 9. A lean liquid absorber solution is introduced via lean liquid inlet 8 into absorber vessel 1. Packing 6 is positioned in absorber vessel 1 to serve as a gas/liquid contacting zone for the upwardly flowing gas stream and the downwardly flowing lean liquid absorber solution. A rich absorber liquid is collected in absorber vessel bottom end 4 of absorber vessel 1 and is removed via rich liquid outlet 11.

The process of the present invention is further demonstrated by the following illustrative embodiment. This illustrative embodiment is however not presented to unduly limit the process of the invention, but to further illustrate the advantages of the hereinabove described embodiments. An actual performance of the present invention was not conducted, but the illustration is considered prospective and reasonably demonstrates the expected performance of the invention.

ILLUSTRATIVE EMBODIMENT

In a commercially designed apparatus for removing a gaseous component from a flowing gas stream, a vertical, cylindrical outer vessel is employed, having a diameter of 1 meter and a length or height of 4.5 meters. An interwall is employed over essentially the complete length of the outer vessel, which wall forms an annulus having a closed bottom end and an open top end, and which is positioned to be uniformly 2.5 centimeters from the inner wall of the outer vessel. A lean liquid inlet pipe having a diameter of 7.5 centimeters is located in the upper end of the vertical vessel. A flowing gas inlet pipe, having a diameter of 15 centimeters is located in a lower portion centrally located position of the vertical vessel. A rich liquid outlet pipe, having a diameter of 7.5 centimeters is located at the bottom or near the bottom of the vertical vessel. A flowing gas stream outlet pipe, having a diameter of 15 centimeters is located at the top or near the top of the vertical vessel. At least one inlet pipe, communicating with the lower end of the annulus, which inlet pipe has a diameter of 2.5 centimeters is used to introduce a lean liquid stream which flows upwardly through the annulus and overflows from the top end of the annulus and thereby protects at least a portion of the outer wall of the vertical vessel from contact with the flowing gas stream and the rich liquid stream.

The foregoing description, drawing and illustrative embodiment clearly illustrate the advantages encompassed by the process of the present invention and the benefits to be afforded with the use thereof.

What is claimed:

1. A gas absorber for removing at least one gaseous component from a flowing gas stream by contacting said gas stream with a lean liquid stream to absorb at least a portion of said gaseous component to produce a rich liquid stream comprising said gaseous component and a flowing gas stream having a reduced concentration of said gaseous component which absorber comprises:
   (a) a double wall forming an annulus having a means for restricting fluid flow into the bottom of said gas absorber from the bottom of said annulus and a means for passing fluid out of an upper section of said annulus into said gas absorber;
   (b) an inlet for said lean liquid stream having a locus in the upper end of said gas absorber;
   (c) an inlet for said flowing gas stream;
   (d) an outlet for said rich liquid stream having a locus in the lower end of said gas absorber;
   (e) an outlet for said flowing gas stream having a reduced concentration of said gaseous component; and
   (f) at least one inlet communicating with the lower end of said annulus which inlet is used to introduce a lean liquid stream at least a portion of which flows upwardly through said annulus and overflows from said top of said annulus and thereby protecting at least a portion of the outer wall from contact with said flowing gas stream.

2. The gas absorber of claim 1 wherein said gas absorber contains a gas/liquid contacting zone comprising packing.

3. The gas absorber of claim 2 wherein said packing comprises metal mesh.

4. The gas absorber of claim 2 wherein said packing is selected from the group consisting of divided carbon particles, Raschig rings, Lessing rings, Berl saddles and grid packing.

5. A process for removing at least one gaseous component from a flowing gas stream by contacting said gas stream with a lean liquid stream in a gas absorber to absorb at least a portion of said gaseous component to produce a rich liquid stream comprising said gaseous component and a flowing gas stream having a reduced concentration of said gaseous component wherein said process comprises:
   (a) passing a first lean liquid stream through at least one inlet communicating with the lower end of a double wall forming an annulus having a means for restricting fluid flow into the bottom of said gas absorber from the bottom of said annulus and a means for fluid flow out of the top of said annulus into said gas absorber wherein at least a portion of said first lean liquid stream flows upwardly through said annulus and overflows from said top of said annulus thereby protecting at least a portion of the outer wall of said gas absorber from contact with said flowing gas stream;
   (b) passing a second lean liquid stream through an inlet having a locus in the upper end of said gas absorber;
   (c) passing said flowing gas stream through an inlet into said gas absorber;
   (d) contacting said second lean liquid stream with said flowing gas stream to produce said rich liquid stream comprising at least a portion of said gaseous component and said flowing gas stream having a reduced concentration of said gaseous component;
   (e) recovering said rich liquid stream comprising at least a portion of said gaseous component from an outlet having a locus in the lower end of said gas absorber; and
   (f) recovering said flowing gas stream having a reduced concentration of said gaseous component from an outlet having a locus in the upper end of said gas absorber.

6. The process of claim 5 wherein said flowing gas stream contains a gaseous component selected from the group consisting of hydrogen chloride, hydrogen fluoride, hydrogen, sulfur dioxide, hydrogen sulfide and ammonia.

7. The process of claim 5 wherein said gas absorber is operated at conditions which include a temperature from about 50° F. (10° C.) to about 250° F. (121° C.), a pressure from about atmospheric to about 1000 psig (6896 kPa gauge), a gas hourly space velocity from about 800 hr$^{-1}$ and a gas/liquid mass ratio from about 0.01 to about 4.

8. The process of claim 5 wherein said first and said second lean liquid streams are aqueous.

9. The process of claim 5 wherein said gas absorber contains a gas/liquid contacting zone comprising packing.

10. The process of claim 9 wherein said packing comprises metal mesh.

11. The process of claim 9 wherein said packing is selected from the group consisting of finely divided carbon particles, Raschig rings, Lessing rings, Berl saddles and grid packing.

* * * * *